June 16, 1931.  P. OKEY  1,810,143
APPARATUS FOR FEEDING LINES
Filed July 22, 1929   2 Sheets-Sheet 1

INVENTOR.
Perry Okey.
BY
ATTORNEY.

June 16, 1931.     P. OKEY     1,810,143
APPARATUS FOR FEEDING LINES
Filed July 22, 1929   2 Sheets-Sheet 2

INVENTOR.
Perry Okey.
BY
Edwin P. Corbett
ATTORNEY

Patented June 16, 1931

1,810,143

UNITED STATES PATENT OFFICE

PERRY OKEY, OF COLUMBUS, OHIO

APPARATUS FOR FEEDING LINES

Application filed July 22, 1929. Serial No. 380,226.

My invention relates to apparatus for feeding lines. It pertains, more particularly, to apparatus for feeding lines such as wires or cables through a conduit or duct such as is usually provided under ground for the reception of cables, telegraph wire or similar lines. My apparatus, however, is not necessarily limited to drawing a line through a conduit but the principles thereof may be applicable to the feeding of a line along the ground or other surface.

The advantages of underground conduits for wires and cables, et cetera, is generally recognized. However, the placing of wires or cables in underground conduits is attended by much difficulty, particularly the initial threading of a draw wire through the conduit. In the past, the preferred method of accomplishing this has been to attach the draw wire to the point of a jointed pole and force one length of the pole into the entrance end of the conduit and then follow up by successive lengths of poles which are jointed to each other. This method is not only slow and tedious but it is very laborious, frequently requiring as many as six men to force the poles through the conduit.

One object of my invention is the provision of a simple and easily operated means for threading a wire through a conduit in much less time and with much less labor than with the methods and apparatus hitherto in use. Another object of my invention consists in the provision of a method and apparatus of such form that the line to be fed through a conduit may be utilized as an aid to the actual feeding of this line through the conduit. Still another object of my invention is to provide a device for drawing a line through a conduit under power, this power being preferably applied intermittently and being capable of application by either manual or mechanical means.

My invention contemplates the provision of a projectile which may be actuated manually or mechanically with a small amount of effort to conduct a draw line or other line or cable through a conduit. In its preferred form, this projectile is so constructed that a wire attached thereto may be caused to progress through a conduit by successively tensioning and relaxing this wire.

More specifically, I preferably provide a projectile which is equipped with means for gripping the walls of the conduit in such a manner as to preclude rearward movement of the projectile in the conduit and to permit forward movement of the projectile as the result of a forward impulse applied thereto. Furthermore, my structure is such that the line to be drawn through the conduit is attached to the projectile, the projectile being of such structure that a rearward pull upon this line will produce a storing of motive power within the projectile while the release of this line will permit this stored motive power to become effective to impel the projectile forwardly in the conduit. Thus, the structure is such that the projectile may be caused to move through the conduit by successively pulling and releasing the line being drawn through the conduit by such projectile.

My projectile may either be actuated manually or it may be actuated by mechanical means. In the following description and drawings I have shown and described a particular form of mechanism which is automatically effective to exert a pull upon the line being drawn through the conduit and then to release this line, continuing these alternative operations as long as is necessary to effect feeding of the projectile and the attached line through the conduit.

Other features of my invention will appear from the following detailed description wherein similar characters of reference designate corresponding parts and wherein Figure 1 is a perspective view of my projectile and the mechanical means for automatically advancing it through a conduit, this mechanical means being shown located in the manhole.

Figure 4:
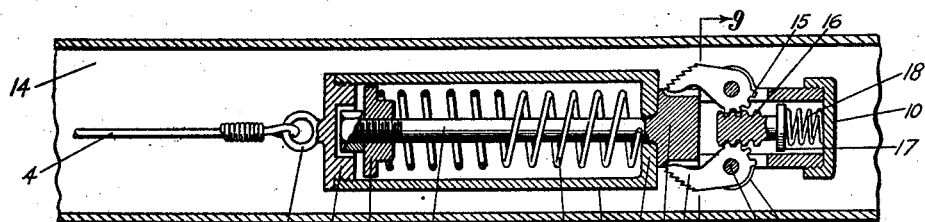
Figure 4 is a cross sectional view of my projectile utilizing a resilient means for the storing of energy.

With reference to the drawings, I have shown in Figure 4 one embodiment of the projectile that I utilize when threading a wire through a conduit of fibre material. This projectile is shown as comprising a main body 1 which is preferably cylindrical throughout its length. One end of the sleeve 1 is provided with a screw plug 2, of approximately the same diameter as the main body 1 which is internally threaded into the sleeve. This screw plug 2 is further provided with an eye 3 which is formed integrally with the outer surface of the plug and is adapted to offer means for securing a wire 4 to the projectile.

The other end of the main body 1 is closed in as at 5, and is centrally bored to permit the rod 6 to freely slide therethrough. One end of the rod 6 adjacent the screw plug 2 is equipped with a circular collar 7, which may or may not be of the same diameter as the inner periphery of the sleeve 1. This collar 7 is threaded onto the rod 6 and is maintained in its position by means of the lock nut threaded on the rod 6 directly therebehind. The screw plug 2 is provided in the inner side with a centrally located bored out portion, thus preventing the rear end of the rod 6 from contacting with the plug when reciprocated into its position adjacent thereto.

The numeral 8 designates a resilient member, which preferably takes the form of a stiff helical spring, that is mounted around the rod 6 intermediate the collar 7 and the inner face of the closed-in portion 5. The purpose of the resilient member 8 is to drive the projectile through the conduit in a manner that will be hereinafter described.

The forward end of the rod 6 is provided with an enlargement, as at 9, comprising a cylindrical portion that is equipped with a cap member 10 threaded on the foremost extremity thereof. The outer periphery of the enlarged section 9 is provided with a plurality of spaced pairs of lugs 11 in such a manner that a slot is formed therebetween, that it is in reality a continuation of a slot formed in the enlargement 9. The lugs 11 of each pair are centrally drilled to receive the pin 12, which carries the dogs 13.

These dogs 13 are machined on the outer extremities thereof to provide a toothed surface, cut in such a manner, that they will bite into the inner periphery of a conduit 14 when properly actuated and brought in contact therewith.

The other end of the dogs 13 is preferably rounded, as shown, and is equipped with a segment of gear as at 15. The teeth, of this segment of gear, are meshed with the rack teeth which are cut on the plug 16, disposed within the hollow interior surface of the enlargement 9. One end of the plug 16 is provided with an enlargement as at 17 against which one end of a resilient member 18 is positioned. The other end of this resilient member 18, which is preferably a light coil spring, is positioned against the inner face of the cap member 10. The purpose of the spring 18 is to keep a backward tension on the plug 16.

With this arrangement of the dogs 13 I have provided a suitable means for preventing my projectile from being drawn backwardly through the conduit 14, although the forward movement of the projectile is not hindered thereby. The actual operation of the projectile just described will be hereinafter referred to.

Figures 6, 7:
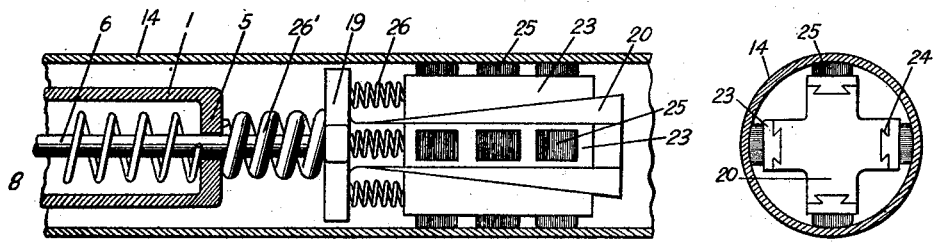
Figure 6 is a longitudinal section of one end of a modification of my projectile which is adapted to be utilized in conduits of vitreous or metallic material.
Figure 7 is an end view of the projectile shown in Figure 6 illustrating the manner in which the resilient members carried thereby contact with the inner wall of a conduit.

As hereinbefore mentioned, I have also provided a projectile which is expressly to be used in conduits of a vitreous or metallic nature. The preferred embodiment of this projectile is shown in Figure 6 wherein the structure of the main body 1 remains the same as that provided for the projectile utilized in the conduits of fibre. The rod 6 is provided at its forward end with a head 19 of less diameter than the inner diameter of the conduit 14. The rod 6 is further provided with an enlarged end 20 that gradually increases in diameter from a point adjacent the annular extension 19 to the outermost limits thereof.

The outer surface of the enlargement 20,

Figure 7, is provided with a plurality of wedges 23 slidably mounted in the dove-tail slots 24 formed on the enlarged end 20 of the rod 6.

I have shown the enlarged surface 20 as being divided into four radial wings. Each wing inclines from the outermost end inwardly toward the annular extension 19. Each is further provided with a dove-tail slot as at 24 into which the dove-tails of a plurality of wedges 23 are inserted. The upper surface of each wedge 23 is provided with a yielding facing member 25, that preferably comprises a block of rubber or similar material. A resilient member 26, which is preferably a small coil spring, is interposed between one face of the annular extension 19 and the rear ends of each of the wedges 23.

These rubber facings 25 serve to grip the inner wall of the conduit 14 since the springs 26 force the wedges 23 forwardly against outwardly inclined tracks tending to maintain the facings 25 into contact with the conduit.

It is sometimes desirable to provide a cushion between the forward face 5, of the main body 1, and the rear face of the winged extension 19. To eliminate the battering effect of the direct contact of these two faces, I have interposed therebetween, and encircling the rod 6, a heavy coil spring as at 26' which materially reduces the jarring force of the cylinder 1 when striking thereagainst, as will be hereinafter explained in the operation of this particular type of projectile.

I have provided further modification of my projectile designed to utilize compressed air as the energy for propelling the projectile through the conduit. This means may be utilized in metallic, vitreous or fibrous conduits. The compressed air mechanism will supplant the resilient member utilized in the other two types of projectile and will necessitate a slightly different main body structure.

Figure 8:
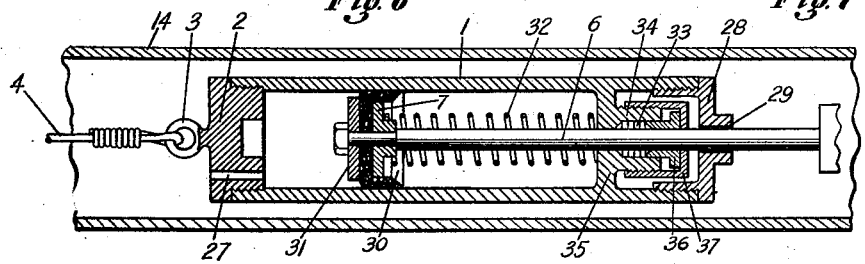
Figure 8 is a cross sectional view of another modification of my projectile wherein the barrel thereof is shown as being equipped with a means for storing energy by the compression of air.
Figure 9:
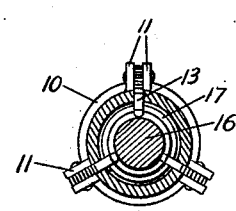
Figure 9 is a sectional view of one end of my projectile, utilizing a resilient energy storing means, showing the manner in which the dogs are disposed on the periphery thereof.

As shown in Figure 8, this type of my device comprises a cylindrical main body 1 as being provided with the screw plug 2 which is bored as at 27 with a small opening. This opening is to be utilized, more or less, as a vent. The other end of the main body 1 is provided with a cap member 28 wherein a centrally disposed opening 29 offers means for slidably positioning the rod 6 therethrough.

The end of the rod 6, positioned within the cylinder 1, is provided with a packing cup 30, that is preferably disposed between the disk 7 and an auxiliary collar 31 mounted on the rod 6. A light spring 32 is mounted on the rod 6, as shown, and is utilized merely as a means for ensuring a return of the rod 6 to its position within the main body 1.

To ensure against leakage around the rod 6, I have provided a gland for enclosing the rod 6, as shown. This gland preferably comprises an annular wall 35 that is formed integrally with the inner surface of the cylinder 1 and is provided with the centrally disposed extension 34.

The extension and wall are both centrally drilled to provide an opening for the rod 6. The diameter of the opening through the extension 34 is somewhat greater than the opening in the wall, which forms a recess in which a packing material 33 may be inserted. The packing material is maintained therewithin by the plug 36, which is also drilled to receive the rod 6 and is maintained in position by means of the outer cap member 37 screwed on the extension 34.

When the wire 4 is pulled rearwardly, the engaging means similar to members 13 of Figure 4 and 23 of Figure 6 are brought into contact with the conduit 14 thus holding the rod 6 against rearward movement causing the air intermediate the packing member 30 and the inner face of the wall 35 of the main housing 1 to be compressed. The energy created by this compressed air will be sufficient upon release of the wire 4 to propel the projectile through the conduit for a short distance as will be hereinafter explained.

Figure 1:
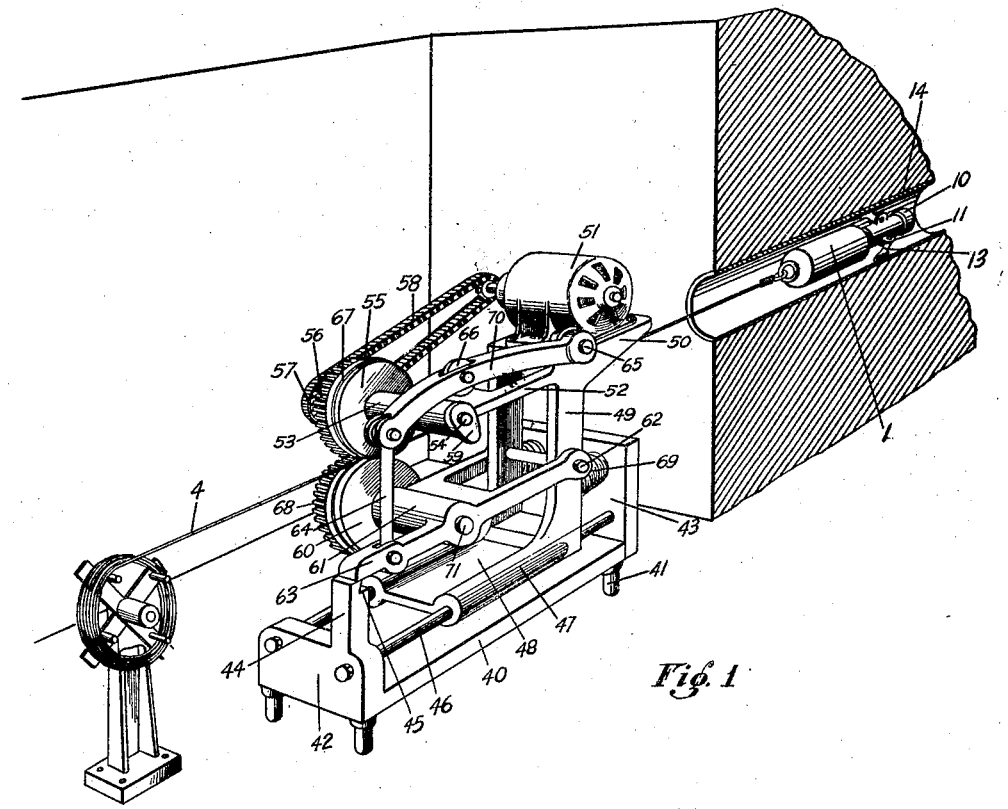

It has been hereinbefore stated that my method of propelling a wire, by means of a projectile through a conduit, may be operated either by a human element or by a mechanical means which I have provided. This mechanical means is best shown in Figure 1. The driving mechanism for my projectile preferably comprises a stationary framework adapted to rest on the floor of a manhole and a secondary frame, slidable on the first and carrying the gripping rolls and other operating elements.

In Figure 1 of the drawings, the numeral 40 designates the stationary framework that is supported by the legs 41. The framework is preferably provided with a horizontal bed plate having vertical end plates 42 and 43 formed integrally with each end thereof.

Figure 2:
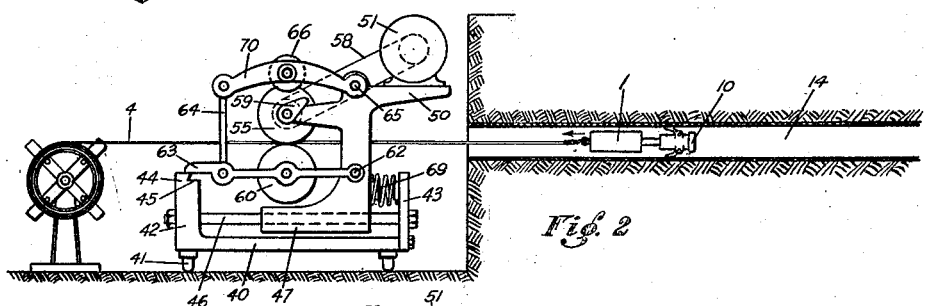
Figure 2 is a side elevation of my projectile and the mechanical means for effecting the successive pulls and releases of the line attached to the projectile, this mechanism being shown in the act of exerting a pull upon the line to effect a storing of motive power in the projectile.

The end plate 42 is provided with an upstanding rectangular member 44 that is notched as at 45, Figure 2, adjacent the upper inner side thereof. A roller supporting member 63 is adapted to be upheld at one end on this upright 44, as will be hereinafter described.

Two parallel spaced rods 46 are supported by the end plates 42 and 43, as shown in Figure 1. These rods lie above the bed plate of the framework 40 and are bolted or otherwise rigidly secured in place. The secondary framework is slidably mounted on these rods.

The framework of the secondary member comprises the cylindrical feet members 47 that are bored longitudinally, as shown and mounted on the rods 46. These feet members are braced horizontally by means of the plate 48 that joins their inner sides. It is apparent that the secondary frame may be easily reciprocated back and forth along these rods.

Each foot member 47 is provided at the forward end thereof with the integrally formed vertical legs 49. These legs act as a support, either directly or indirectly for the remaining elements of this device. The legs may be braced by such auxiliary members as deemed necessary.

Adjacent the upper end of the legs and extending forwardly away from the balance of the device is a horizontal motor table 50 that is formed integrally with both legs, whereon the motor 51 is adapted to rest. Directly below this table, and extending inwardly from the other side of the legs, is a gripping roll support 52 that is also formed integrally with each leg. The outer end of this support is transversely enlarged as at 53 and is bored centrally to receive the axle 54 of a gripping roll 55 that is rotatably secured adjacent the other end thereof.

This axle 54 also carries a gear member 56 of a sufficient radius to contact with and rotate the gear member 68 of a second gripping roll 60 (Figure 10) hereinafter referred to.

On the outer end of the shaft 54 is disposed a sprocket member 57 that is connected to the shaft of the motor 51 by a suitable chain 58. The other end of the axle 54 is provided with a cam member 59 that is preferably of the design shown. All of the elements just referred to are rotatable with the shaft 54.

Directly below the gripping roll 55 is positioned a second gripping roll 60 that is mounted on a suitable shaft 71 journaled in the enlarged portion 61 of a pivoted support member. This support member is preferably of the design shown having two arms journaled to the legs 49 by means of the pin 62. One of these arms is extended as at 63 and is adapted to rest on the upper edge of the upright 44. The end of this member is provided with a rounded bevel shown.

This arm 63 is provided with a slot having aligning openings in the wall thereof wherein the lower end of the vertical rod 64 is pivoted. The other end of this rod is pivotally secured to the lever 70. This lever, which is preferably bowed, as shown, is pivotally mounted on the upper end of one of the legs 49 by means of a suitable pivot pin 65.

The lever 70 is slotted near the center thereof and a roller as at 66 is mounted therein. This roller lies directly above the cam member 59 and is adapted to contact therewith during a certain period of the rotation of the cam.

Figure 10:
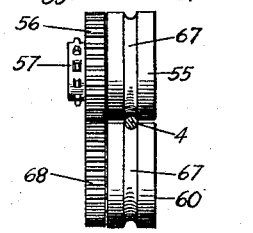
Figure 10 is an elevation showing the gripping rolls that I employ on the driving mechanism for stressing the wire.

The gripping rolls, which are better shown in Figure 10, are provided with complemental annular grooves 67 disposed in their peripheries. The lower roll 60 is similarly equipped with a gear 68 that is shown in mesh with the gear 56 lying adjacent the first gripping roll. In Figure 10 the wire 4 is shown extending through the opening formed by the cooperation of these two grooves.

The numeral 69, Figure 1, designates two heavy coil springs that are interposed between the legs 49 and the end plate 43. The function of these springs is to exert a force on the secondary framework that will tend to force it away from the end plate.

Figure 3:
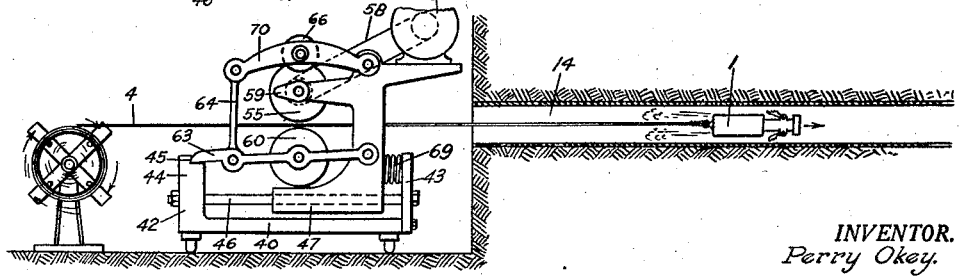
Figure 3 is a side elevation of the structure shown in Figure 2 but showing the mechanical means in its position when the line is released to permit the stored motive power to become effective.

The projectile is operated by successively pulling on the wire 4 and releasing it. Figures 2 and 3 show the effect of pulling and releasing the wire, in that a pull in the direction of the arrow, Figure 1, will cause the projectile to resist movement in that direction, while a release of tension on the wire will result in the forward motion of the projectile.

Figure 5:
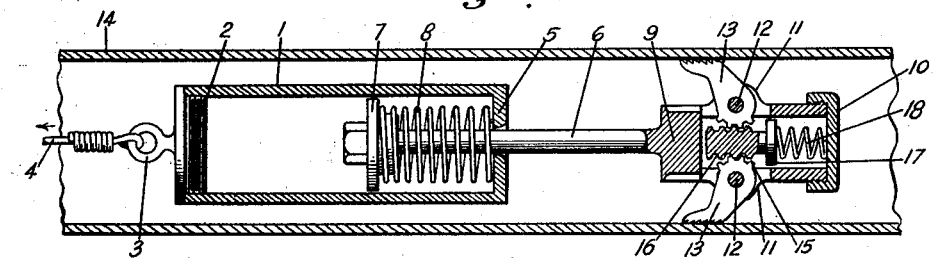
Figure 5 is a cross sectional view similar to that of Figure 4 showing the projectile in the energy storing position wherein the elements for restraining movement in one direction are extended into contact with the side walls of a conduit.

The specific operation of the projectile can be more clearly set forth with reference to Figure 5. It will be assumed that the projectile has been thrust into the conduit 14, which in this instance will be of a fibrous nature. The wire 4 is pulled in the direction of the arrows, thus accentuating the gripping action of the dogs on the conduit walls.

With the dogs firmly set in the conduit, the rod 6 will be prevented from moving, thus the only other portion of the projectile capable of movement is the cylinder 1, which, when it travels backwardly causes the spring 8 to be compressed between the inner face of the closed-in portion 5 and the annular spring seat 7. This is best shown in Figure 5.

At the instant the wire 4 is released, the energy stored in the compressed spring is made to do work on the cylinder 1, snapping it forward and causing the outer surface of the closed-in portion 5 to deliver a heavy blow on the enlargement 9 of the rod 6. This blow will drive the projectile forward for a short distance where the dogs will again grip the walls of the conduit to maintain the projectile in advanced position.

If the conduit is of a vitreous nature, I preferably utilize the projectile head shown in Figure 6. When the wire is stressed in opposition to the usual direction of movement of the projectile the wedges 23 ride further up the enlarged portions 20 of the rod 6, thus bringing the rubber plugs 25 into firm contact with the walls of the conduit. These rubber plugs normally lie lightly against the conduit wall and are maintained in that position by means of the resilient members 26. Thus any rearward movement of the rod 6 is again prevented, and the same cycle of operation as hereinbefore related takes place.

The spring 26' is placed between the closed-in portion of the cylinder 1 and the plate 19 of the rod 6. The function of the member is apparent in that the rude jar or shock that would normally be borne by the plate 19 is somewhat cushioned by this spring. When the cylinder 1 does act to propel the projectile, the enlarged portion 20 is sharply driven forward thus unseating the wedges 23, which move down their inclined surfaces against the resilient action of the springs 26, which force the wedges 23 back into normal position.

If desired the projectile cylinder shown in Figure 8 may be substituted for the projectile cylinder shown in Figure 4 or 6. It makes no difference which form of gripping head is utilized. This projectile is adapted to receive its propelling energy from the air compressed in the chamber intermediate the leather washer 30 and the inner face of the closed-in portion 34. The operation of this projectile is exactly the same as the other projectile only that the energy is derived from air under pressure rather than spring means.

It is well within the scope of my invention that the various parts of these projectiles may be interchanged, as I have set forth. If it is desired, any gripping head may be mounted in connection with any of the propelling means shown, it being a desirable feature of my invention that the elements shown be interchangeable.

In operating any of the various embodiments of my projectile mechanically, I have shown in Figure 1, the wire 4 attached thereto mounted on a suitable rotatable standard, the wire being threaded through the grooves 67 of the gripping rolls 55 and 60 and being attached at one end to the projectile resting in the conduit.

It may be assumed that the driving mechanism is primarily in the position shown in Figure 3 wherein the wire is free from pull by the gripping rolls. It may also be assumed that the projectile is at rest in the conduit. With these conditions existing, the operation will be as follows:

The motor 51 is energized which causes the chain to turn the sprocket 57 thus rotating the gripping roll 55 and gear 56. Furthermore, the cam 59 is caused to rotate, thus bringing it in contact with the wheel 66 carried by the pivoted lever 64. As the cam 59 is further rotated, the lever 70 is raised thus elevating the outer end thereof and as a result pulling the lower lever 63 upwardly.

This lever, which is seated in the notch 45 is moved upwardly until such time as it shall completely leave the notch which will allow the resilient force of the springs 69 to force the whole secondary frame rearwardly a short distance.

The elevation of the lower lever will bring the gripping roll 60 into contact with wire 4, thus seating the wire in the grooves 67, as shown in Figure 10. The continued rotation of these rolls will stress the wire 4 thus causing the projectile to oppose the pull on the wire, in the manner hereinbefore related.

When the projectile is stressed to its utmost capacity the action of the gripping rolls 55 and 60 on the wire 4 will cause the whole secondary frame to be moved forwardly along the rods 46 against the tension of the springs 69, until such time as the lever 63 will again drop into the notch 45, thus dropping the roll 60 out of contact with the roll 55 and releasing the wire, Figure 3, and resultantly allowing the projectile to advance through the conduit. Continued repetition of this operation of the driving mechanism will automatically drive the projectile steadily through a conduit without further need of human intervention.

I think that I have been the first to contemplate any means of the type set forth for threading wires through conduits. It is apparent that the driving mechanism will need only a minimum of human attention. Even if the projectile is operated by hand, one man could easily do more work and thread more wire than another using a plurality of poles. I believe this invention fills a long felt want in this particular type of work, and the simplicity of operation and the minimum of working parts are important advantageous attributes.

Having thus described my invention, what I claim is:

1. A combination of a projectile, a line attached to said projectile, power rotated rolls, means for automatically causing said rolls to exert successive pulls upon said line, means for causing said rolls to relieve the pull on said line intermittently, and means in said projectile for translating each pull into stored potential energy and rendering it effective as kinetic energy to advance said projectile when each pull is relieved.

2. Apparatus for feeding a line through a conduit comprising a projectile to which said line is designed to be connected, means on said projectile adapted to grip the walls of the conduit to preclude rearward movement of said projectile, resilient means for forcing said last named means into operative position, mechanism actuated by the intermittent pulling of said line to subject said projectile to intermittent blows for propelling it forwardly through said conduit, resilient means for operating said mechanism, the resilient means for operating said wall gripping means being independent of the resilient means for operating said mechanism, and said wall gripping means being operable by its resilient means independently of the pull upon such line.

3. Apparatus for feeding a line through a conduit comprising a projectile to which said line is designed to be connected, mechanism actuated by the intermittent pulling of such line to subject said projectile to intermittent blows for propelling it forwardly through said conduit, resilient means for operating said mechanism, means on said projectile adapted to grip the walls of said conduit to preclude rearward movement thereof, means independent of said mechanism in operative engagement with said gripping means for moving said gripping means into and out of frictional contact with the walls of said conduit, and independent resilient means exerting pressure upon said last named means to move the gripping means into contact with the walls of said conduit.

4. Apparatus for feeding a line through a conduit comprising a projectile to which said line is designed to be connected, mechanism actuated by the intermittent pulling of such line to subject said projectile to intermittent blows for propelling it forwardly through said conduit, resilient means for operating said mechanism, dogs having gear segments on their inner ends on said projectile adapted to grip the walls of said conduit to preclude rearward movement thereof, a toothed rack in operative engagement with the gear segments of said dogs for moving said dogs into and out of frictional contact with the walls of said conduit, and independent resilient means exerting pressure upon said rack to move the dogs into contact with the walls of said conduit.

5. A combination of a projectile, a line attached to said projectile, power actuated means for automatically exerting successive pulls upon said line, means for causing said power actuated means to relieve the pull on said line intermittently, and means in said projectile for translating each pull into stored potential energy and rendering it effective as kinetic energy to advance said projectile when each pull is relieved.

In testimony whereof I, hereby, affix my signature.

PERRY OKEY.